United States Patent [19]
Smeeth

[11] Patent Number: 5,771,754
[45] Date of Patent: Jun. 30, 1998

[54] BIKE HYDRAULIC DISK DRIVE AND METHOD THEREFOR

[76] Inventor: Stephen F. Smeeth, 835 Lee Mountain Rd., Sedona, Ariz. 86351

[21] Appl. No.: 599,498

[22] Filed: Jan. 24, 1996

[51] Int. Cl.⁶ .............................. G05G 1/14; B62M 19/00
[52] U.S. Cl. ...................... 74/594.2; 74/594.1; 280/216; 280/212
[58] Field of Search .............................. 74/372, 117, 119, 74/121, 165, 166, 437, 833; 280/261, 276, 284, 703, 212

[56] References Cited

U.S. PATENT DOCUMENTS

| | | |
|---|---|---|
| 425,471 | 4/1890 | Toense ..................................... 280/212 |
| 1,410,326 | 3/1922 | Labak ..................................... 280/212 |
| 1,650,450 | 11/1927 | Jochum ................................... 280/216 |
| 2,177,381 | 10/1939 | Bichi ...................................... 280/216 |
| 3,742,777 | 7/1973 | Mathauser . | 
| 3,934,492 | 1/1976 | Timbs ....................................... 74/740 |
| 3,944,253 | 3/1976 | Ripley ..................................... 280/238 |
| 4,061,046 | 12/1977 | Lang . | 
| 4,201,094 | 5/1980 | Rathmell . | 
| 4,580,652 | 4/1986 | Turner et al. ............................. 74/481 |
| 4,773,495 | 9/1988 | Haubenwallner ....................... 280/212 |
| 4,942,936 | 7/1990 | Gardner ................................. 180/207 |
| 5,354,085 | 10/1994 | Gally ..................................... 280/285 |

Primary Examiner—Vinh T. Luong
Attorney, Agent, or Firm—Harry M. Weiss; Jeffrey D. Moy; Harry M. Weiss & Associates, P.C.

[57] ABSTRACT

A hydraulically controlled bicycle drive system for variably transferring rotational motive power from a rider to the chain of a bicycle. The bicycle comprises a chain drive, a plurality of hydraulic clamps, and a plurality of roller clamps; a rotatable disk driven by the pedals of the bicycle received in the hydraulic clamps and roller clamps; and a control mechanism controllable by the rider for applying a variable pressure to the hydraulic clamps.

16 Claims, 2 Drawing Sheets

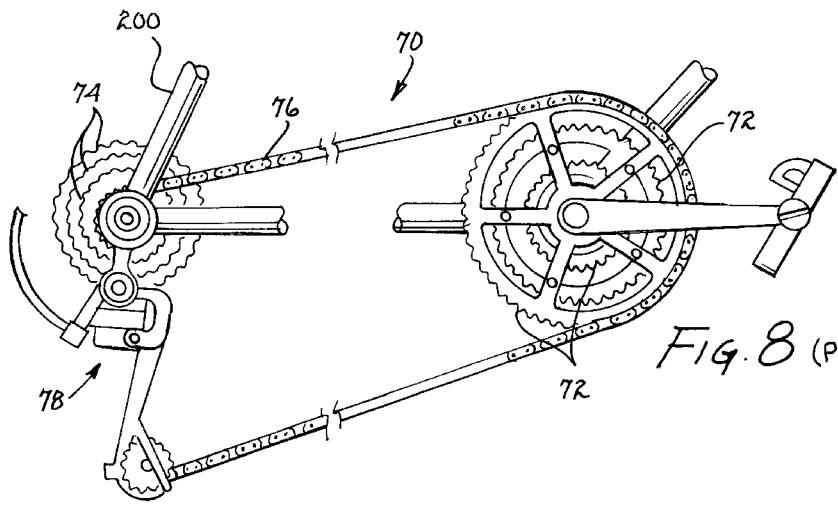
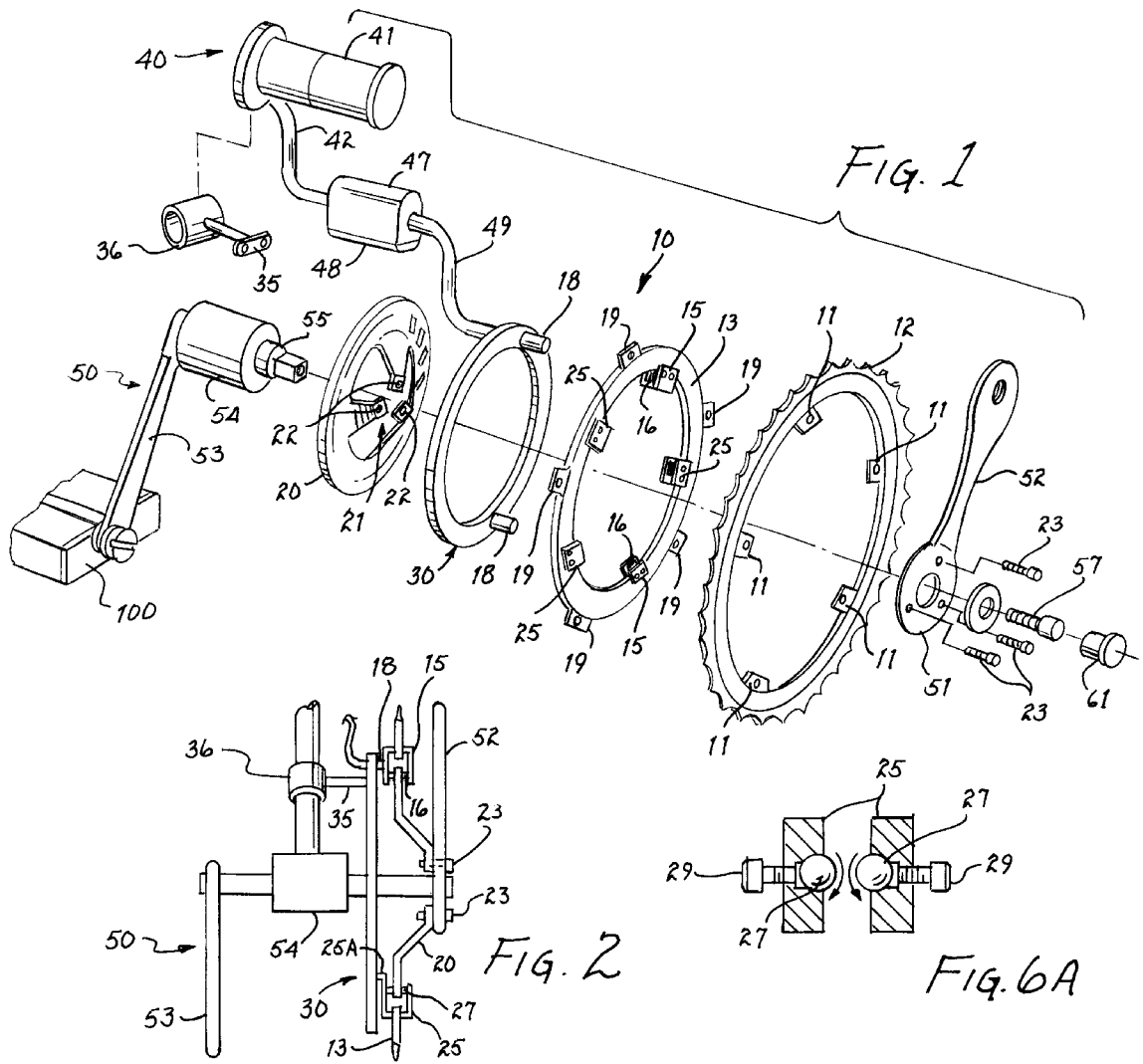

BIKE HYDRAULIC DISK DRIVE AND METHOD THEREFOR

BACKGROUND OF THE INVENTION

1. Field of the Invention

This invention relates to bicycles of the traditional type in which the rider pedals the bicycle operating a sprocket and transferring power through a chain to another sprocket on the rear wheel of the bicycle. More specifically, this invention relates to a variable controllable bicycle drive system for transferring rotational motive power from the rider pedalling the bicycle to the chain of such a chain driven bicycle.

2. Description of the Prior Art

The conventional bicycle has a sprocket driven by the user of the bicycle by means of a pedal-crank arrangement. The pedal-driven sprocket is connected to a sprocket on the rear wheel of the bicycle for transferring the pedal-generated power to the rear wheel of the bicycle. It is common practice with many kinds of bicycles to provide a variable ratio drive arrangement between the pedal-driven sprocket and the rear wheel sprocket. While there are a great many devices of this type, they generally comprise a plurality of pedal-driven sprockets or a plurality of chain-driven sprockets mounted to the rear wheel, or a combination of such sprocket arrangements. A variable drive ratio is attained by shifting the chain from one sprocket or pair of sprockets to another sprocket or pair of sprockets. While these mechanisms are effective and are efficient, they are also very unstable and are prone to malfunction. Even the slightest bump or collision tends to mis-align the chain shifting mechanism making it impossible to shift from one sprocket ratio to another and, not infrequently, making it impossible to use the bicycle without repair. Moreover, these prior art mechanisms require the use of a rear wheel derailleur to shift the chain between sprockets on the rear wheel, which derailleur protrudes from the bicycle and is vulnerable to breaking in certain riding conditions, including for example mountain biking. Replacement of a rear wheel derailleur is expensive and time-consuming.

There are certain hazards associated with variable speed bicycle drives as well. If, for example, a bicycle is equipped with a coaster brake and the chain shift mechanism malfunctions, it may be impossible to operate the coaster brake. If the rider is traveling down a long incline, this may pose certain risks to the user.

These shortcomings of the more or less standard chain driven-chain shifting bicycles are well known and universally recognized, but no fully satisfactory solution has been proposed to avoid the problem. Among the proposed solutions are a number of hydraulic drive mechanisms which provide for a variable ratio between the rotational rate of the pedals and the rotational rate of the rear wheel. Some of these hydraulic systems are very elegant, and also very expensive and very heavy. These systems, generally, depend upon a pedal-driven hydraulic pump and a hydraulic motor driven by the hydraulic pump. While these kinds of systems are reliable, they are generally too expensive and too heavy for use on bicycles. Examples of this kind of system are shown in the following United States patents:

| Patent No. | Inventor | Issue Date (Month, Day, Year) |
|---|---|---|
| 4,078,816 | Smith | 03/14/78 |
| 4,087,105 | Amarantos | 05/02/78 |
| 4,290,621 | Davey | 09/22/81 |
| 4,347,700 | Kantner et al. | 09/07/82 |
| 5,346,234 | Kadaja | 09/13/94 |
| 5,387,000 | Sato | 02/07/95 |

It is the object of this invention to provide a light, inexpensive and yet reliable mechanism to permit the variable transfer of power from the pedals, as the user pedals the bicycle, to the rear wheel via a more or less conventional chain drive.

SUMMARY OF THE INVENTION

The present invention is a hydraulically controlled bicycle drive system for variably transferring rotational motive power from a rider pedalling the bicycle to the chain of a chain driven bicycle. The invention is suitable for incorporation in new bicycles and is also suitable for retrofitting existing bicycles. The drive system comprises a chain drive that includes a sprocket mounted, constructed and configured to rotate for receiving the chain, which drives the rear wheel, and driving the chain. The chain drive also comprises at least one, and preferably a plurality of hydraulic clamps. The bicycle drive system also comprises a disk mounted for rotation and driven by the rotation of the pedals by the user of the bicycle. A portion of the disk is received in the hydraulic clamp previously referred to, which is part of the chain drive. A control mechanism is provided providing means that are controllable by the rider for applying a variable pressure by the hydraulic clamp on the chain drive to the disk. The application of a variable pressure from the hydraulic drive to the disk variably transfers rotational power from the disk to the chain drive and, of course, to the chain drive to the rear of the bicycle. The drive system preferably comprises a handlebar grip and a hydraulic ram as part of the means for applying the variable pressure by the hydraulic clamp to the disk. It would be possible to construct the drive system in other ways without departing from the spirit and scope of the invention, including by using a trigger, switch, or lever instead of a handlebar grip.

The rider operates the bicycle very much in the same way that he or she would operate a conventional chain driven bicycle. As the bicycle is pedalled, the power is transferred to the chain and drives the bicycle in a conventional manner. The difference is that the handlebar grip, which is rotatable relative to the handlebar, operates a hydraulic ram which, in turn, applies a greater or lesser pressure to the clamp on the chain drive. As a greater pressure is applied, the ratio of rotation between the disk and the chain drive approaches and, at highest pressure, becomes one. If it is desired to obtain a lower ratio of drive, then less pressure is applied and the chain drive will rotate at some fraction less than one, e.g., one-half, one-third, etc., of the rotational velocity of the disk.

The mechanism is reliable, not prone to malfunction, assures that braking power by conventional coaster brake will always be available, and eliminates the need for a rear wheel derailleur.

BRIEF DESCRIPTION OF THE DRAWINGS

FIG. 1 is a schematic exploded view of the essential elements of the drive system of this invention.

FIG. 2 is a rear view of the preferred embodiment of the drive system of this invention.

FIG. 6a is a top, sectional view of one of the roller clamps of this invention taken along line 6a—6a of FIG. 6.

FIG. 8 is a perspective view of the prior art drive system.

DESCRIPTION OF THE PRIOR ART

Figure 3:
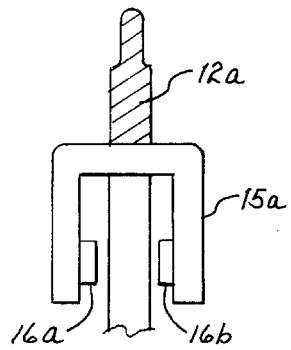
FIG. 3 depicts an alternative arrangement for mounting the chain drive sprocket and the hydraulic clamps together.

Referring to FIG. 8, a perspective view of the prior art drive system is disclosed. The prior art drive system, referred to generally by reference number 70, provides a variable drive ratio by providing a plurality of pedal-driven sprockets 72 and a plurality of chain-driven sprockets 74 that are mounted to the rear wheel (not shown). A variable drive ratio is attained in the prior art system by shifting a chain 76 from one pedal-driven sprocket 72 to another and/or by shifting a chain 76 from one chain-driven sprocket 74 to another. Such shifting requires the use of a derailleur apparatus 78. This invention eliminates the need for a derailleur apparatus 78, multiple pedal-driven sprockets 72, and multiple chain-driven sprockets 74.

DESCRIPTION OF THE PREFERRED EMBODIMENT

Figure 2A:
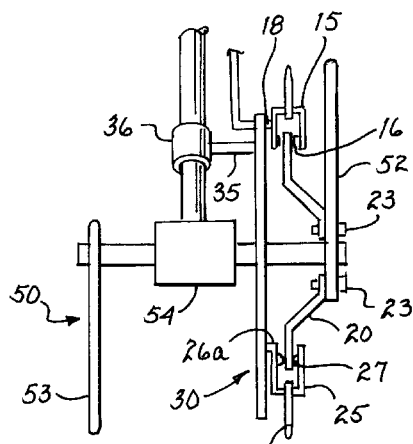
FIG. 2a is a rear view of the preferred embodiment of the drive system of this invention showing a hydraulic clamp in a fully open position.

Making particular reference to FIGS. 1, 2, and 6, reference number 10 refers generally to the hydraulic drive system (hereinafter "drive system") of the present invention. Referring specifically to FIG. 1, drive system 10 comprises a chain drive sprocket 12, a disk 20 which is connected to be driven by the pedals 100, a hydraulic power transfer assembly 30, a hydraulic pressure control system 40, and a crank system 50 for pedalling the bicycle (not shown). As the bicycle is pedalled, the disk 20 is directly rotatably driven. The mechanism of this invention transfers all or a portion of that rotational power to the chain drive sprocket 12, the amount of such transfer being controllable by the operator of the drive system 10 by manipulation of the hydraulic control system 40 and through the hydraulic transfer mechanism 30.

The following is a description of the exemplary embodiment and is provided with the understanding that various alternative mechanisms may be used without departing from the spirit and scope of the invention. In particular, it is observed that it would be entirely possible and clearly within the ability of an ordinary artisan simply to reverse the arrangement of the disk and the clamps, putting the clamps on the pedal-driven mechanism and putting the disk to be driven by the application of pressure to the clamps.

Referring now to FIG. 1 the sprocket 12 is provided with a plurality of mounting tabs 11 which are constructed and configured to be attached to mounting tabs 19 on a clamp support ring 13 by means of bolts or other fasteners (not shown). At least one and preferably a plurality of hydraulic clamps 15 are also secured to the clamp support ring 13. The construction of hydraulic clamps is known to those with ordinary skill in the art. Referring specifically to FIGS. 2, 2a, 4, and 6, each of the clamps 15 is provided with a pair of pads 16, which oppose each other on opposite sides of the disk 20 and, in response to hydraulic pressure inside the clamps 15, clamp more or less tightly to the disk 20 causing the sprocket 12 to rotate more or less relative to the rotation of the disk 20. Thus, an increase in the amount of hydraulic pressure behind the pads 16 will cause those pads 16 to clamp more tightly around the disk 20, generating additional friction and thus altering the speed of the bicycle in response to a given force. Conversely, a reduction in the amount of hydraulic pressure behind the pads 16 will allow those pads to contact the disk 20 less tightly, thus generating relatively less friction and oppositely altering the speed of the bicycle in response to an identical given force. Like disk brakes in an automobile, the pads 16 allow the disk 20 to rotate at a rate that varies based on the amount of hydraulic pressure applied to the pads 16. The hydraulic clamps 15 may be provided with bleeder outlets 17 to avoid the inclusion of gas inside the hydraulic system and are connected by a hydraulic line 18 to the hydraulic transfer system 30. Positioned behind the pads 16 are fluid chambers 16a (see FIG. 4). These hydraulic clamps 15 receive the disk 20 and function very much like conventional disk brakes commonly used in automobiles, motorcycles, on some bicycles, etc. Of course, the clamps need not be as heavy or bulky as may be used in applications on heavier vehicles.

Referring to FIG. 1, at least one and preferably a plurality of roller clamps 25 are also secured to the clamp support ring 13. Each of the roller clamps 25 is provided with a pair of rollers 27, preferably ball bearings or the like, which oppose each other on opposite sides of the disk 20. Referring specifically to FIG. 6a, each of the rollers 27 is partially recessed into spherical grooves 27a so that a portion of each roller 27 extends out of the grooves 27a and contacts the disk 20 (not shown). The grooves 27a are dimensioned to permit the rollers 27 to roll within the grooves 27a as shown by the arrows, and to allow for the position of the rollers 27 to be adjusted relative to the disk 20 so that the rollers 27 maintain contact with the disk 20. The rollers 27 are provided for alignment purposes only. Unlike the pads 16 which affect the extent to which force applied to the pedals 100 is translated to the chain drive sprocket 12, the rollers 27 simply maintain the disk 20 in proper alignment, as shown in FIG. 6. The rollers 27 are each partially recessed into spherical grooves 27a, so that a portion of each roller 27 extends out of the grooves 27a and contacts the disk 20. The grooves 27a are dimensioned to permit the rollers 27 to roll within the grooves 27a as shown by the arrows, and to allow for the position of the rollers 27 to be adjusted relative to the disk 20 so that the rollers 27 maintain contact with the disk 20. The proximity of each of which rollers 27 to the disk 20 may be adjusted with roller adjust bolts 29, which bolts 29 enter the roller clamps 25 through the grooves 27a so that a distal end of each of the bolts 29 may contact the portion of the rollers 27 that is retained within the grooves 27a, thereby forcing the rollers 27 toward the disk 20, or allowing the rollers 27 to move away from the disk 20 as desired. The roller clamps 25 act to maintain the disk 20 in proper alignment during the operation of the drive system 10. A drive connecting rod 25a connects the roller clamps 25 and the hydraulic transfer system 30 to assist in the driving of the face of the transfer system 30 during operation. In the preferred embodiment of the drive system 10, there are two hydraulic clamps 15 and three roller clamps 25. However, it is possible to vary the number of roller clamps 25 and hydraulic clamps 15 without departing from the spirit or scope of this invention.

Figure 4:
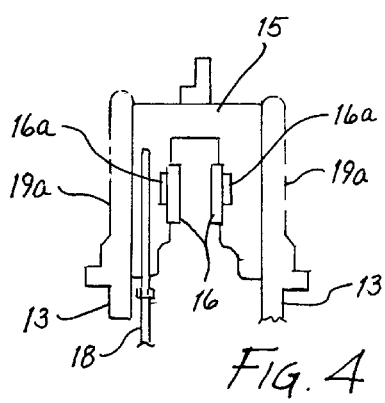
FIG. 4 is a rear view of one of the hydraulic clamps of the drive system of this invention.
Figure 5:
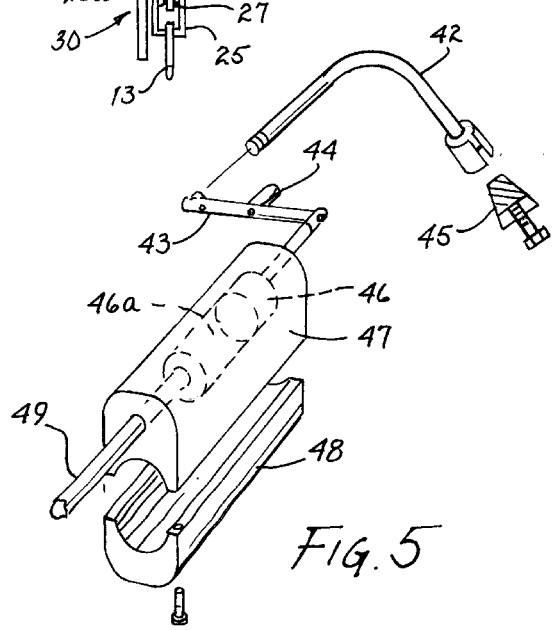
FIG. 5 is a detailed, exploded depiction of the hydraulic ram operator for permitting the rider to apply a variable pressure between the clamp and the disk.
Figure 6:
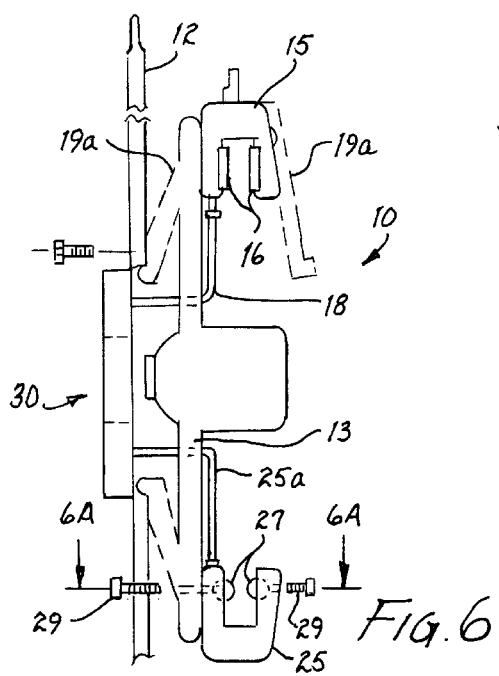
FIG. 6 is a rear view of one of the hydraulic clamps and one of the roller clamps of the drive system of this invention.

FIG. 4 and 6 show, in phantom, several alternative embodiments of the drive system of the present invention. In one alternative embodiment, shown in FIG. 4, the hydraulic clamps 15 and roller clamps 25 (not shown) are attached to the side of the clamp support ring 13, rather than underneath clamp support ring 13. In this embodiment, the clamp support ring 13 is attached to the sprocket 12 (not shown) with tabs 19a. As also shown in phantom in FIGS. 4 and 6, the hydraulic clamps 15 may be attached to either side of the clamp support ring 13 with tabs 19a.

Referring to FIG. 1, disk 20 is provided with a hub arrangement 21 which may be circular or may have portions cut out to reduce the weight of the disk 20 in which threaded apertures 22 are formed for receiving a plurality of mounting bolts 23 which extend through a correspondingly configured hub 51 on a pedal arm 52. The pedals 100 may, of course, be connected to drive the disk 20 by any of a virtually infinite number of arrangements, the hub arrangement 21 being shown and described simply as the presently preferred embodiment.

As in a conventional bicycle 200 (see FIG. 8), the drive system 10 comprises a crank system 50. Referring to FIG. 1, the crank system in this arrangement comprises the mechanism generally identified as 50 and the elements 51 and 52 which are the mount and crank arm for one of the pedals 100, and, on the other side of the bicycle (not shown), a crank arm 53 which extends through a bottom bracket 54 which is received in a bicycle in the conventional manner, and extends as a spindle 55 which is squared at the end thereof or has flats on it for being received in the mount 51, and the end of which spindle 55 is hollow and threaded for receiving a bolt 57, whereby operation of the crank system 50 positively rotates the disk 20. This construction further comprises a washer 59, through which the bolt 57 passes, and a cap 61 which covers the upper portion of the bolt 57. The crank system 50 could be constructed in other ways without departing from the spirit or scope of this invention; for example, the spindle 55 could have a threaded post for receiving a nut rather than a hollow, threaded portion for receiving a bolt 57.

Figure 7:
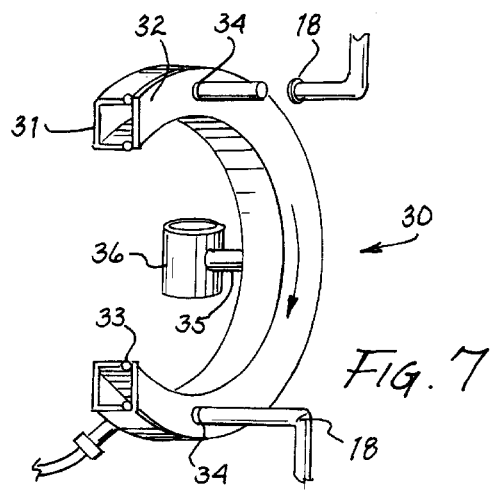
FIG. 7 is a cross-sectional view of the hydraulic power transfer assembly of the drive system of this invention.

Referring to FIG. 7, the hydraulic transfer mechanism 30 comprises an annular hydraulic keeper 31 which rotatably receives an annular chamber closure plate 32. Seals such as O-rings 33 may be provided to assure a fluid tight seal between the annular hydraulic keeper 31 and the closure plate 32. The closure plate 32 is provided with an outlet 34 which is connected to the hydraulic conduit 18. It will be apparent upon the foregoing and observation of FIGS. 1, 4, 6, and 7 in particular, that an increase in hydraulic pressure in the annular hydraulic keeper 31 will result in an increase in hydraulic pressure in the clamps 15 previously described.

Referring to FIGS. 2 and 7, it is convenient to provide a bracket 35 which comprises a sleeve 36 for mounting of the annular hydraulic keeper 31 to the frame of the bicycle (not shown). It will be observed also that since the closure plate 32 is rotatably mounted relative to the annular hydraulic keeper 31, the hydraulic pressure in the annular hydraulic keeper 31 can be transferred to the clamps 15 even though the clamps 15 are rotating relative to the annular hydraulic keeper 31. Referring briefly to FIG. 3, there is depicted in that figure an alternative arrangement for mounting the sprocket 12a to the clamps 15a that include pads 16b. In this embodiment, the sprocket 12a is simply an annular ring having teeth formed on the outer periphery thereof with the clamps 15 adjoined to the inner periphery of the annulus forming the ring. As indicated previously, a great many variations are possible in the details of construction without departing from the invention.

Reference is now made to FIGS. 1, 2, 4, 5, and 6. The rider is able to control the pressure in the annular hydraulic keeper 31 and, hence, the pressure in the clamps 15 which, in turn, applies more or less pressure to the pads 16 in contact with the disk 20. The mechanism for providing such control may be similar to any of many kinds of handlebar controls, including levers, switches, and triggers. In this embodiment, and referring specifically to FIGS. 1 and 5, the grip 41 is rotatable relative to the handlebar and operates a cable 42 which is connected to a lever 43 which is mounted on a pivot 44. Conventional connectors such as that generally depicted at 45 may be used to connect the cable 42 and the grip 41. The lever 43, upon actuation of the grip 41, moves a piston 46 in a cylinder 46a formed in a housing 47 which is clamped to the bicycle handlebar or frame by means of the clamp 48. Hydraulic pressure is then applied through hydraulic line 49 to the hydraulic transfer chamber system 30 and, as previously described, through the hydraulic conduit 18 to the clamps 15. Thus, simply by rotating the grip 41 on the handlebar (not shown), the rider is able to control the pressure in the clamps 15 and, hence, control the drive ratio between the disk 20 and the chain drive sprocket 12. This permits the rider to continue pedalling at the same rate and yet to vary the effective coupling ratio between the hydraulic drive system 10 and the rear wheel (not shown) to accommodate to hills, etc. The methods for constructing hydraulic pumps, including means for controlling hydraulic pressure and hydraulic transfer chamber systems such as system 30 and for combining pumps and hand controls, is known to those of ordinary skill in the art.

It will be recognized by those skilled in the art that a variety of fasteners, sprockets, disks, and mechanic arrangements may be used in carrying out the invention without departing from spirit and scope of the invention. Essential features of the invention are a chain drive constructed and configured to rotate comprising a sprocket for receiving and driving a chain, a disk mounted for rotation by the operation of the pedals, one or more hydraulic clamps and means controllable by the rider for applying a variable pressure to the hydraulic clamp or clamps for controlling the ratio of transfer of rotational power from the pedals to the chain as a function of the amount of pressure applied through the clamps. In the preferred embodiment, the clamps are mounted on the chain drive and the disk is positively driven by the pedals. Also, in the preferred embodiment, the control means comprises a handlebar grip and a hydraulic ram.

What is claimed is:

1. A hydraulically controlled bicycle drive system for variably transferring rotational motive power from a rider pedalling a bicycle to a chain of a chain-driven bicycle comprising, in combination:

chain drive assembly means constructed and configured to rotate comprising a sprocket for receiving and driving the chain wherein such chain drive assembly means further comprises at least one hydraulic clamp and at least one roller clamp;

pedals rotationally attached to said chain drive assembly means;

disk means mounted for rotation driven by rotation of said pedals having a portion of said disk means received in said hydraulic clamp and in said roller clamp; and means controllable by the rider for applying a variable pressure using the hydraulic clamp coupled to said disk means thereby variably transferring rotational power from said disk means to said chain drive assembly means.

2. The bicycle drive system of claim 1 wherein the means for applying a variable pressure to the disk means comprises a handlebar grip controlled hydraulic ram.

3. The bicycle drive system of claim 2 wherein the chain drive assembly means comprises at least one hydraulic clamp comprising a pair of opposed pads receiving the disk means therebetween and means for applying hydraulic pressure to each of said pads.

4. The bicycle drive system of claim 3 wherein the means for applying a variable pressure to the hydraulic clamps comprises an annular hydraulic pressure chamber having a stationary member secured to the bicycle and a rotatable member in fluid communication with the chain drive assembly means.

5. The bicycle drive system of claim 4 wherein the chain drive assembly means comprises at least one roller clamp each comprising a pair of opposed rollers receiving the disk means therebetween.

6. The bicycle drive system of claim 1 wherein the chain drive assembly means comprises at least one hydraulic clamp comprising a pair of opposed pads receiving the disk means therebetween and means for applying hydraulic pressure to each of said pads.

7. The bicycle drive system of claim 6 wherein the means for applying a variable pressure to the hydraulic clamps comprises an annular hydraulic pressure chamber having a stationary member secured to the bicycle and a rotatable member in fluid communication with the chain drive assembly means.

8. The bicycle drive system of claim 1 wherein the means for applying a variable pressure to the hydraulic clamp comprises an annular hydraulic pressure chamber having a stationary member secured to the bicycle and a rotatable member in fluid communication with the chain drive assembly.

9. A method for providing a hydraulically controlled bicycle drive system for variably transferring rotational motive power from a rider pedalling a bicycle to a chain of a chain-driven bicycle comprising the steps of:

providing chain drive assembly means constructed and configured to rotate comprising a sprocket for receiving and driving the chain wherein such chain drive assembly means further comprises at least one hydraulic clamp and at least one roller clamp;

providing pedals rotationally attached to said chain drive assembly means;

providing disk means mounted for rotation driven by rotation of said pedals having a portion of said disk means received in said hydraulic clamp and in said roller clamp; and providing means controllable by the rider for applying a variable pressure using the hydraulic clamp coupled to said disk means thereby variably transferring rotational power from said disk means to said chain drive assembly means.

10. The method of claim 9 wherein the step of providing means for applying a variable pressure to the disk means further comprises the step of providing a handlebar grip controlled hydraulic ram.

11. The method of claim 10 wherein the step of providing chain drive assembly means further comprises the step of providing at least one hydraulic clamp comprising a pair of opposed pads receiving the disk means therebetween and providing means for applying hydraulic pressure to each of said pads.

12. The method of claim 11 wherein the step of providing means for applying a variable pressure to the hydraulic clamps further comprises the step of providing an annular hydraulic pressure chamber having a stationary member secured to the bicycle and a rotatable member in fluid communication with the chain drive assembly means.

13. The method of claim 12 wherein the step of providing chain drive assembly means further comprises the step of providing at least one roller clamp each comprising a pair of opposed rollers receiving the disk means therebetween.

14. The method of claim 10 wherein the step of providing chain drive assembly means further comprises the step of providing at least one hydraulic clamp comprising a pair of opposed pads receiving the disk means therebetween and means for applying hydraulic pressure to each of said pads.

15. The method of claim 14 wherein the step of providing means for applying a variable pressure to the hydraulic clamps further comprises the step of providing an annular hydraulic pressure chamber having a stationary member secured to the bicycle and a rotatable member in fluid communication with the chain drive assembly means.

16. The method of claim 9 wherein the step of providing means for applying a variable pressure to the hydraulic clamp further comprises the step of providing an annular hydraulic pressure chamber having a stationary member secured to the bicycle and a rotatable member in fluid communication with the chain drive assembly.

* * * * *